(12) United States Patent
Jing et al.

(10) Patent No.: US 8,354,160 B2
(45) Date of Patent: Jan. 15, 2013

(54) ARTICLES HAVING DURABLE HYDROPHOBIC SURFACES

(75) Inventors: Naiyong Jing, Woodbury, MN (US); Kathryn M. Spurgeon, River Falls, WI (US); George Van Dyke Tiers, St. Paul, MN (US); Vivian W. Jones, Woodbury, MN (US); Brant U. Kolb, Afton, MN (US); Chuntao Cao, Woodbury, MN (US); Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 613 days.

(21) Appl. No.: 11/426,122

(22) Filed: Jun. 23, 2006

(65) Prior Publication Data
US 2007/0298216 A1   Dec. 27, 2007

(51) Int. Cl.
*B32B 5/30* (2006.01)
(52) U.S. Cl. ........ 428/143; 428/147; 428/148; 428/149; 428/324; 428/328; 428/329; 428/330; 428/331
(58) Field of Classification Search ................ 428/148, 428/149, 156, 175, 324, 326, 328, 329, 330, 428/331, 143, 147
See application file for complete search history.

(56) References Cited

U.S. PATENT DOCUMENTS

| | | | |
|---|---|---|---|
| 3,354,022 A | 11/1967 | Dettre et al. | |
| 3,686,154 A * | 8/1972 | Khan | 525/326.3 |
| 3,931,428 A | 1/1976 | Reick | |
| 5,435,816 A | 7/1995 | Spurgeon et al. | |
| 5,972,809 A | 10/1999 | Faler et al. | |
| 6,117,555 A | 9/2000 | Fujimori et al. | |
| 6,132,861 A | 10/2000 | Kang et al. | |
| 6,180,181 B1 | 1/2001 | Verardi et al. | |
| 6,352,758 B1 * | 3/2002 | Huang et al. | 428/143 |
| 6,495,624 B1 | 12/2002 | Brown | |
| 6,511,701 B1 | 1/2003 | Divigalpitiya et al. | |
| 6,800,354 B2 | 10/2004 | Baumann et al. | |
| 6,929,849 B2 | 8/2005 | Koskenmaki et al. | |
| 2002/0045045 A1 | 4/2002 | Adams et al. | |
| 2003/0013795 A1 | 1/2003 | Nun et al. | |
| 2005/0223945 A1 | 10/2005 | Baumgart et al. | |
| 2006/0029808 A1 | 2/2006 | Zhai | |

FOREIGN PATENT DOCUMENTS

| | | |
|---|---|---|
| DE | 102 05 784 | 8/2003 |
| FR | 1 449 606 | 5/1966 |
| JP | 11-226785 | 8/1999 |
| JP | 2002-012813 | 1/2002 |

(Continued)

OTHER PUBLICATIONS

Hozumi et al., "Preparation of ultra water-repellent films by microwave plasma-enhanced CVD", *Thin Solid Films 303*, 1997, pp. 222-225.

(Continued)

*Primary Examiner* — Donald J Loney
(74) *Attorney, Agent, or Firm* — Douglas B. Little

(57) ABSTRACT

Method of forming a very hydrophobic, extremely hydrophobic or superhydrophobic surface comprising depositing a composition comprising hydrophobic microparticles, hydrophobic nanoparticles, or a mixture thereof and a binder in sufficient quantity to provide a hydrophobic or a superhydrophobic surface on a substrate having a micropatterned surface having raised portions, recessed portions or a combination thereof.

10 Claims, 1 Drawing Sheet

FOREIGN PATENT DOCUMENTS

| | | |
|---|---|---|
| JP | 2003-001736 | 1/2003 |
| JP | 2003-145652 | 5/2003 |
| WO | WO 97/31357 | 8/1997 |
| WO | WO 01/49424 | 7/2001 |
| WO | WO 01/68940 A1 | 9/2001 |
| WO | WO 2005/092520 | 10/2005 |

OTHER PUBLICATIONS

Miller et al. "Effect of Roughness as Determined by Atomic Force Microscopy on the Wetting Properties of PTFE Thin Films", *Polymer Engineering and Science*, Jul. 1996, vol. 36, No. 14, pp. 1849-1855.

Ogawa et al., "Development of a Transparent and Ultrahydrophobic Glass Plate", *Jpn. J. Appl. Phys. 32*, Apr. 15, 1993, Pt. 2, No. 4B, pp. 614-615.

Tadanaga et al., "Formation Process of Super-Water-Repellent $Al_2O_3$ Coating Films with High Transparency by the Sol-Gel Method", *J. Am. Ceram. Soc.*, 1997, vol. 80, No. 12, pp. 3213-3216.

Tadanaga et al., "Super-Water-Repellent Al2O3 Coating Films with High Transparency", *J. Am. Ceram. Soc.*, 1977, vol. 80, No. 4, pp. 1040-1042.

Veeramasuneni et al., "Hydrophobicity of ion-plated PTFE coatings", *Progress in Organic Coatings 31*, 1997, pp. 265-270.

Wenzel, "Resistance of Solid Surfaces to Wetting by Water", *Industrial and Engineering Chemistry*, Aug. 1936, vol. 28, No. 8, pp. 988-994.

Wu et al., "Thin films with Nanotextures for Transparent and Ultra Water-Repellent Coatings Produced from Trimethylmethoxysilane by Microwave Plasma CVD", *Chemical Vapor Deposition*, 2002, vol. 8, No. 2.

Ep Application No. 07 78 1027 Supplementary EP Search Report (May 2, 2011).

\* cited by examiner

ARTICLES HAVING DURABLE HYDROPHOBIC SURFACES

TECHNICAL FIELD

This invention relates to substrates having hydrophobic or superhydrophobic surfaces.

BACKGROUND

Water-repellent coatings or articles are mentioned or disclosed in, for example, U.S. Pat. No. 6,800,354, which discloses self cleaning surfaces formed by applying a coating having particles having an average particle size of less than 100 nanometers on the surface of a substrate. The U.S. Pat. No. 6,800,354 patent also discloses forming a nanoscale structure over a microscale structure where the nanoscale particles and microscale particles are distributed in the same coating or a first coating having microscale particles is applied to a substrate and a second coating with nanoscale particles is applied to the substrate. The coating may be made hydrophobic by treatment with a hydrophobizing substance such as an organosilane.

Self-cleaning hydrophobic structures are disclosed in U.S. Patent Publication No. US 2003/0013795. This application discloses a self-cleaning hydrophobic surface formed from particles secured with a carrier that includes a binder and particles. The surface is said to be self-regenerating by exposing new structure forming particles, which are released by way of UV light and the effects of wind and weather.

DISCLOSURE OF INVENTION

The present application provides a method of forming a durably very-hydrophobic, extremely-hydrophobic or superhydrophobic surface comprising depositing a liquid composition including a binder and hydrophobic microparticles, hydrophobic nanoparticles, or a mixture thereof; in sufficient quantity to provide a durably very-hydrophobic, extremely-hydrophobic or superhydrophobic surface on a substrate having a micropatterned surface having raised portions, recessed portions or a combination thereof, and drying or otherwise hardening the liquid composition.

In another aspect, the method includes depositing a liquid composition comprising a binder and hydrophobic nanoparticles in a sufficient quantity to provide a durably very-hydrophobic, extremely-hydrophobic or a superhydrophobic surface on a substrate having a micropatterned surface comprising raised portions, recessed portions or a combination thereof and drying or otherwise hardening the liquid composition.

In another aspect, the composition of the invention can form a discontinuous layer on a micropatterned surface, interrupted by projecting features of the micropatterned surface, while maintaining a very-hydrophobic, extremely-hydrophobic or superhydrophobic character over the whole surface.

In another aspect, the invention provides an article comprising a substrate having a micropatterned surface having raised portions, recessed portions or a combination thereof, and a coating composition on the substrate located at least on the portions between the raised portions or in the recessed portions and comprising a binder and hydrophobic microparticles, hydrophobic nanoparticles, or a mixture thereof; in sufficient quantity to provide a durably very-hydrophobic or extremely-hydrophobic surface.

These and other aspects of the invention will be apparent from the accompanying drawing and this specification. In no event, however, should the above summaries be construed as limitations on the claimed subject matter, which subject matter is defined solely by the attached claims, as may be amended during prosecution.

DETAILED DESCRIPTION

Figure 1:
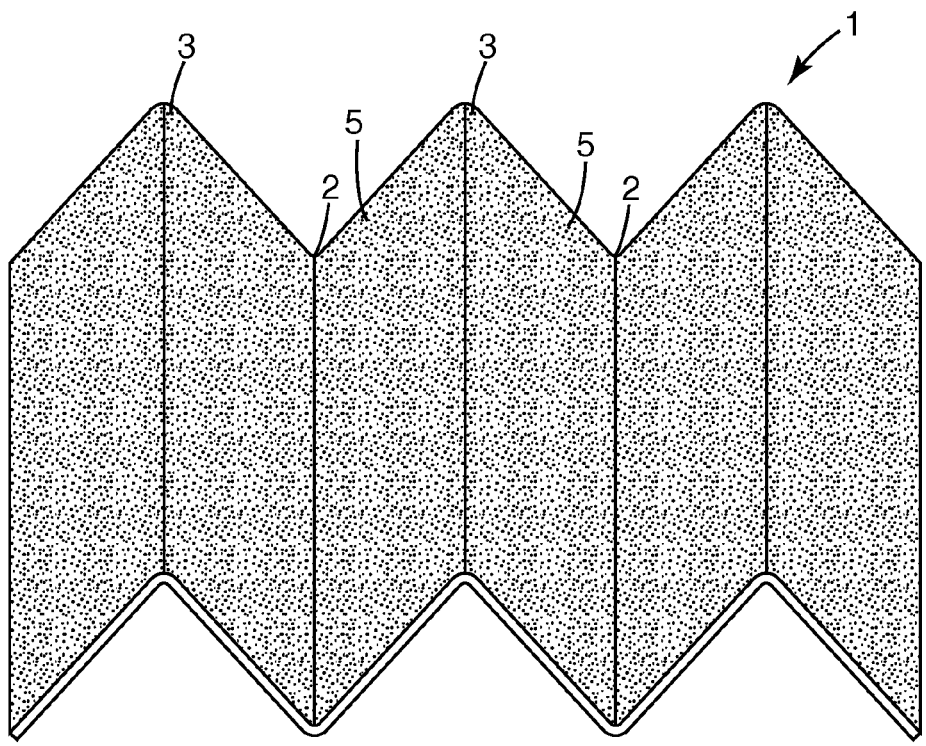
FIG. 1 is a representation of a coating composition of the present invention on a micropatterned surface.

The words "a", "an", and "the" are used interchangeably with "at least one" to mean one or more of the elements being described. By using words of orientation such as "atop", "on", "uppermost", "underlying" and the like for the location of various elements in the disclosed coated articles, we refer to the relative position of an element with respect to a horizontally-disposed, upwardly-facing substrate. We do not intend that the disclosed articles should have any particular orientation in space during or after their manufacture.

The term "hydrophobic" refers to a surface or coating that is difficult to wet with water. A surface would be considered hydrophobic if it demonstrated a receding water contact angle of at least 70°, very hydrophobic if it demonstrated a receding water contact angle of a least 110°, and extremely hydrophobic if it demonstrated a receding water contact angle of at least 120°. The term "superhydrophobic" refers to a surface or coating that is extremely difficult to wet with water. A superhydrophobic surface or coating will usually have receding water contact angles in excess of 140°, and often in excess of 150°.

The term "polymer" refers to polymers, copolymers (e.g., polymers formed or formable from two or more different monomers), oligomers and combinations thereof.

The term "micropatterned surface or substrate" refers to a surface or substrate that has at least one surface which has an intended plurality of features that define a profile characterized by raised portions and recessed portions which are raised or recessed relative to a datum surface. The raised portions of the micropatterned surface have regular, or at least partially regular, repeating features which may for example be disposed irregularly and be about 5 to about 150 µm above the recessed or other portions (e.g., datum) of the surface. Preferably, the repeating features may for example be about 10 µm to about 125 µm above the recessed or other portions of the surface. More preferably, the repeating features may for example be 15 µm to about 100 µm above the recessed or other portions of the surface. The pitch (center-to-center distance) between the repeating recessed portions or raised portions may for example be from about 10 µm to about 250 µm in length and preferably from 30 µm to about 200 µm in length.

Preferably, there is a relationship between the size of water droplets likely to be encountered and the durably very-hydrophobic, extremely-hydrophobic or superhydrophobic articles. It is preferred that the water droplet diameter be larger than the pitch of the features in the micropatterned surface.

The term "particles" refers to microparticles, nanoparticles or mixtures thereof. The term "microparticles" refers to particles having an average particle size of about 0.1 to about 100 µm. The term "nanoparticles" refers to particles having an average particle size of about 1 to about 100 nm. Typically, the size of the microparticles or nanoparticles is significantly smaller than the distance between the raised portions in the micropatterned surface, or the pitch of the features. In an exemplary embodiment, particles suitable for practicing the invention are microparticles, nanoparticles or a mixture thereof having an average particle size of from about 5 nm to about 100 µm. Preferably, the particles can have an average particle size of from about 50 nm to about 50 µm. In another exemplary embodiment, the particles are nanoparticles having an average particle size of from about 1 nm to about 100 nm. The particles can be spheroidal or non-spheroidal, e.g., irregularly shaped particles. The term "average particle size" refers to the size of primary particles, as they would be classified by means known in the art, and is not the size of agglomerates. Particle size is generally the average diameter of a spheroidal particle and approximately the largest dimension of an acicular particle.

The disclosed coatings may be used in a variety of applications that will be familiar to those skilled in the art. For example, the disclosed coatings may be applied to articles on which a durably very-hydrophobic, extremely-hydrophobic or superhydrophobic surface may be desired. Such a surface may have, for example, a receding water contact angle of at least about 110°, preferably at least about 120°, yet more preferably at least about 130°, yet more preferably at least about 140°, and most preferably at least about 150°.

Representative articles having surfaces that may benefit from being durably very-hydrophobic, extremely-hydrophobic or superhydrophobic include architectural surfaces, vehicle surfaces, marine vessel surfaces, and signage. Non-limiting examples of applications for architectural surfaces include windows, surfaces vulnerable to graffiti such as walls or bridges, and the like. Non-limiting examples of applications for vehicles include automotive parts such as windows, body parts, mirrors, wheels, light assemblies, and the like; and airplane parts such as windows, anti-icing coatings for wings or tail assemblies, wheels, light assemblies and the like. Non-limiting examples of applications for marine vessels include windows, hull applications such as anti-algae coatings, drag reduction coatings for reducing fuel consumption, anti-icing coatings for reducing ice buildup and the like. Non-limiting examples of signage applications include self-cleaning or anti-dew surfaces, such as retroreflective signs and the like.

In another embodiment, the present invention provides a method for making a coated durably very-hydrophobic, extremely-hydrophobic or a superhydrophobic article comprising:
  a) providing a substrate having a micropatterned surface having raised portions, recessed portions or a combination thereof;
  b) providing a particle composition comprising hydrophobic microparticles, hydrophobic nanoparticles, or a mixture thereof, and a binder;
  c) depositing on at least a portion of the substrate the particle composition; and
  e) drying, or otherwise hardening the binder.

The microparticles or nanoparticles suitable for practicing the present invention include surface-modified particles wherein the particles can be insoluble metal oxides, or salts thereof. Non-limiting examples of suitable metal oxides include silicon oxide, aluminum oxide, tin oxide, zinc oxide, bismuth oxide, titanium oxide, zirconium oxide, lanthanide ("rare-earth") oxides, mixtures thereof, and the like; other suitable metal salts such as calcium carbonate, calcium aluminate, magnesium aluminosilicate, potassium titanate, cerium ortho-phosphate, hydrated aluminum silicate, metal salt clays such as montmorillonite, illite, Kaolin clay, halloysite ($Al_2SiO_2O_5(OH)_2$), mixtures thereof, and the like; and mixtures of metal oxides with metal salts. In an exemplary embodiment, the microparticles or nanoparticles can be silica particles.

The microparticles or nanoparticles often can be modified to increase the hydrophobicity of the particles by contacting them in a solution of a hydrolytically reactive silane bearing at least one hydrolyzable group, preferably with a catalytic amount of hydrofluoric acid. The resulting mixture can be placed in an ultrasonic bath at a temperature above room temperature for sufficient time to enhance the hydrophobicity of the nanoparticles. Specific hydrolyzable reactive groups can include —F, —Cl, —$OCH_3$, —$OC_2H_5$, —NHAc, —$N(Ac)_2$ where Ac represents any acyl group, for example, —C(=O)$CH_3$, —C(=O)$CH_2CH_3$, and the like, derived from a lower carboxylic acid. Exemplary silanes include organosilanes selected from the group consisting of hexamethyl disilazane, methyl triethoxysilane, isooctyl triethoxysilane, octyl triethoxysilane, phenyl triethoxysilane, diphenyldiethoxysilane, 5,6-epoxyhexyltriethoxysilane, 3,3,3-trifluoropropyl-trimethoxysilane, heptadecafluoro-1,1,2,2-tetrahydrodecyl-triethoxysilane, 3-(pentafluorophenyl)propylmethyldichlorosilane, tridecafluoro-1,1,2,2-tetrahydrooctyl-dimethylchlorosilane, nonafluoro-1,1,2,2-tetrahydrohexyl-trichlorosilane, 3-(methacryl-oxy)propyltrimethoxysilane, 4-vinylphenylmethyltrimethoxysilane, 11-(chlorodimethylsilylmethyl)-tricosane, [2-(3-cyclohexenyl)ethyl]trimethoxysilane, and mixtures thereof, and in limited amounts one or more subsequently reactive silanes such as 3-aminopropyl trimethoxysilane, N-(2-aminoethyl)-3-aminopropyltrimethoxysilane, 3-bromopropyltrimethoxysilane, vinyltriethoxysilane and mixtures thereof, intended to provide bonding and crosslinking sites to strengthen the silane structure.

A variety of materials can be used to prepare a suitable substrate. Suitable substrates can be selected, for example from organic materials such as polyesters, polyolefins such as polypropylene and polyethylene, polystyrenes, polycarbonates, polyimides, polyurethanes, fluoropolymers, polyacrylates, polymethacrylates, polyvinyl chlorides, polyvinyl acetates, polyvinyl acetate-polyvinyl chloride copolymers, cellulose acetates and co-butyrates, silicone rubbers, epoxy resins and the like; metals such as iron, stainless steel, aluminum, copper, silver, gold, and the like; and inorganic substances such as stone, cement, ceramics, glasses, and the like. Non-limiting examples of suitable substrates include materials such as polyethylene terephthalate, and bisphenol A polycarbonate.

The hydrophobic microparticles or nanoparticles and binder may be combined in a variety of ratios. The inventive coating compositions desirably contain sufficient particles to provide a dried or hardened coating having an increased water contact angle compared to a coating that does not include such microparticles or nanoparticles, and sufficient binder so that the applied coating is visually smooth and continuous, as initially applied. For example, considering only the weight of the particles and binder, exclusive of any solvent or other added materials, the disclosed coating compositions may contain about 5 to about 95 weight percent particles and about 95 to about 5 weight percent binder; preferably about 10 to about 75 weight percent microparticles and about 90 to about 25 weight percent binder; more preferably about 10 to about 50 weight percent microparticles and about 90 to about 50 weight percent binder; or yet more preferably about 10 to about 30 weight percent microparticles and about 90 to about 70 weight percent binder. In an exemplary embodiment, the binder/particle composition may be softer than the substrate, as measured by, for example, a Shore D or A-2 Durometer (Shore Instrument Company, Jamaica, N.Y.).

The binder may include a fluoropolymer or a hydrocarbon (non-fluorinated) polymer. Non-limiting examples of suitable fluoropolymers include 1,1-difluoroethylene homopolymer, copolymers of 1,1-difluoroethylene and hexafluoropropylene, copolymers of tetrafluoroethylene and hexafluoropropylene, copolymers of 1,1-difluoroethylene and tetrafluoroethylene, copolymers of 1,1,2,3,3,3-hexafluoro-1-propene, 1,1-difluoroethylene and tetrafluoroethylene; terpolymers of tetrafluoroethylene, hexafluoropropylene and 1,1-difluorethylene, terpolymers of hexafluoropropylene, tetrafluoroethylene, and ethylene and the like. Suitable fluoropolymers can also include polymers having a hydrocarbon backbone and fluoroalkyl groups as side chains such as esters of terminally polyfluorinated alcohols with non-fluorinated acrylic (acid) polymers.

Hydrocarbon polymers suitable for practicing the invention include polymers derived from one or more olefinic monomers, oligomers, or polymers. Non-limiting examples of suitable hydrocarbon polymers include silicone polymers, polyolefins and their copolymers such as ethylene, propylene, diene terpolymer (EPDM) rubbers, and acrylate polymers. Representative olefinic monomers, oligomers, or polymers include carbon-containing compounds having at least one site of unsaturation. Such olefinic monomers, oligomers, or polymers can react, optionally in the presence of an initiator, to provide polymeric products. The olefinic monomers, oligomers, or polymers may comprise or include a mixture of polyolefins, (meth)acrylate esters, allyl ethers, vinyl esters, vinyl ethers and the like. Epoxy resins may also be used as the binder.

A variety of solvents may be employed in the disclosed methods and coating compositions. Representative solvents include, for example, esters such as methyl acetate, ethyl acetate and butyl acetate; alcohols such as methanol and ethanol; amides such as dimethylacetamide and dimethylformamide; dimethylsulfoxide; ketones such as acetone, methyl ethyl ketone, methyl isobutyl ketone, methyl amyl ketone, cyclohexanone and N-methyl pyrrolidinone; tetramethylene sulfone (sulfolane); ethers such as tetrahydrofuran, 2-methyl tetrahydrofuran and methyl tetrahydrofurfuryl ether; cyclic esters such as delta-valerolactone and gamma-valerolactone; fluorinated solvents such as perfluoro-2-butyltetrahydrofuran and hydrofluoroethers; other materials that will dissolve the binder but not the microparticles, nanoparticles, and mixtures thereof.

The disclosed coating compositions may also contain other organic liquids which do not dissolve the binder or the particles, and may contain water, provided that such other organic liquids and water do not detract unduly from applying and drying or hardening the desired coating. For example, such other organic liquids or water may represent more or less than one-third, less than one-tenth, less than 1/20th or less than 1/100th by weight of the disclosed coating compositions. Expressed on a percentage basis, the solvent amount may for example be about 20 to about 99.5 wt. percent, about 20 to about 90 wt. percent or about 20 to about 80 wt. percent of the coating composition.

The inventive method may, for example, provide a very hydrophobic surface having a static water contact angle of at least about 110°. Preferably the surface has a receding water contact angle of at least about 120°. More preferably, the surface has a receding water contact angle of at least about 130°. Yet more preferably, the surface has a receding water contact angle of at least 1400, most preferably at least 150°.

The inventive coating compositions may contain a variety of optional additional ingredients. Exemplary additional ingredients include binder crosslinking agents, initiators (e.g., photoinitiators and thermal initiators), and separately-added microparticle or binder adhesion promoting agents (e.g., silanes). In the following it is understood that the term "methacryl" includes methacrylates when listing acrylates. Exemplary crosslinking agents include, for example, poly(meth)acryl monomers including di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, caprolactone-modified neopentylglycol hydroxypivalate diacrylate, caprolactone-modified neopentylglycol hydroxypivalate diacrylate, cyclohexanedimethanol diacrylate, diethylene glycol diacrylate, dipropylene glycol diacrylate, hydroxypivalaldehyde-modified trimethylol-propane diacrylate, neopentyl glycol diacrylate, tricyclodecanedimethanol diacrylate, triethylene glycol diacrylate and tripropylene glycol diacrylate. Other suitable crosslinking agents include tri(meth)acryl containing compounds such as glycerol triacrylate, trimethylolpropane triacrylate, pentaerythritol triacrylate, and tris(2-hydroxyethyl)isocyanurate triacrylate. Additional suitable crosslinking agents include higher functionality (meth)acryl containing compounds such as ditrimethylolpropane tetraacrylate, dipentaerythritol hexa- and pentaacrylate, pentaerythritol tetraacrylate, caprolactone modified dipentaerythritol hexaacrylate, hydantoin moiety-containing poly(meth)acrylates, for example, as described in U.S. Pat. No. 4,262,072, and oligomeric (meth)acryl compounds such as, for example, urethane acrylates, polyester acrylates, epoxy acrylates, polyacrylamides, and combinations thereof. Suitable crosslinking agents are widely available from vendors including Sartomer Company, Exton, Pa.; UCB Chemicals Corporation, Smyrna, Ga.; and Aldrich Chemical Company, Milwaukee, Wis. Exemplary commercially available crosslinking agents include SR-351 trimethylolpropane triacrylate ("TMPTA") and SR-444 and SR 494 pentaerythritol tri/tetraacrylate ("PETA"), all from Sartomer Company. Mixtures of crosslinking agents and monofunctional materials (for example, mixtures of multifunctional and monofunctional (meth)acrylates, such as a mixture of TMPTA and methyl methacrylate), may also be employed.

Other crosslinking agents or monofunctional materials that may be utilized in the disclosed coating compositions include fluorinated (meth)acrylates such as perfluoropolyether (meth)acrylates. These perfluoropolyether acrylates may desirably be based on multi-(meth)acrylate or mono-(meth)acrylate derivatives of hexafluoropropylene oxide ("HFPO") and may (in the case of the multi-(meth)acrylate derivatives) be used as a sole crosslinking agent. The multi-(meth)acrylate derivatives may also be used with non-fluorinated monofunctional (meth)acrylates such as methyl methacrylate, or with non-fluorinated crosslinking agents such as TMPTA or PETA, and the mono-(meth)acrylate derivatives may be used with non-fluorinated crosslinking agents such as TMPTA or PETA.

Exemplary initiators include free-radical photoinitiators such as benzophenone and its derivatives; benzoin, alpha-methylbenzoin, alpha-phenylbenzoin, alpha-allylbenzoin, alpha-benzylbenzoin; benzoin ethers such as benzyl dimethyl ketal (e.g., IRGACURE™ 651, from Ciba Specialty Chemicals Corporation of Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., DAROCUR™ 1173, from Ciba Specialty Chemicals Corporation) and 1-hydroxycyclohexyl phenyl ketone (e.g., IRGACURE™ 184, from Ciba Specialty Chemicals Corporation); 2-methyl-1-[4-(methylthio)phenyl]-2-(4-morpholinyl)-1-propanone (e.g., IRGACURE™ 907, from Ciba Specialty Chemicals Corporation); 2-benzyl-2-(dimethylamino)-1-[4-(4-morpholinyl)phenyl]-1-butanone (e.g., IRGACURE™ 369, from Ciba Specialty Chemicals Corporation); aromatic ketones such as benzophenone and its derivatives and anthraquinone and its derivatives; benzildimethylketals (e.g., ESACURE™ KB-1, from Lamberti S.p.A of Gallarate, Spain); onium salts such as diazonium salts, iodonium salts, sulfonium salts; titanium complexes (e.g., CGI 784 DC, from Ciba Specialty Chemicals Corporation); halomethylnitrobenzenes; and mono- and bis-acylphosphines (e.g., IRGACURE™ 1700, IRGACURE™ 1800, IRGACURE™ 1850, IRGACURE™ 819, IRGACURE™ 2005, IRGACURE™ 2010, IRGACURE™ 2020 and DAROCUR™ 4265, all from Ciba Specialty Chemicals Corporation. Mixtures of photoinitiators may also be employed.

Photosensitizers may also be used. For example, the photosensitizer 2-isopropyl thioxanthone from First Chemical Corporation, Pascagoula, Miss. may be used in conjunction with photoinitiators such as IRGACURE™ 369.

Exemplary thermal initiators include azo, peroxide, persulfate and redox initiators, and mixtures thereof. If desired, mixtures of photoinitiators and thermal initiators may be employed. Initiators typically are used in a total amount less than about 10 weight percent, more typically less than about 5 weight percent, based on the total coating composition weight.

Exemplary adhesion promoting agents include photograftable silane esters containing olefinic functionality such as 3-(trimethoxysilyl)propyl methacrylate and vinyltrimethoxy silane. These photograftable silane esters may react with the binder to form a silyl-grafted material having pendent siloxy groups. Such siloxy groups may be available to form a bond with the microparticles, with adjacent coating layers or with the substrate thereby providing improved adhesion, improved coating durability or both improved adhesion and improved durability. Other exemplary adhesion promoting agents include amino-substituted organosilanes such as 3-aminopropyltrimethoxysilane and its oligomers (e.g., SILQUEST™ A-1110 from GE Silicones, Wilton, Conn.); 3-aminopropyltriethoxysilane and its oligomers (e.g., SILQUEST™ A-1100 and SILQUEST™ A-1106, from GE Silicones); 3-(2-aminoethyl)aminopropyltrimethoxysilane (e.g., SILQUEST™ A-1120 from GE Silicones); SILQUEST™ A-1130 from GE Silicones; (aminoethylaminomethyl)-phenethyltrimethoxysilane; (aminoethylaminomethyl)phenethyltriethoxysilane; N-(2-aminoethyl)-3-aminopropylmethyldimethoxysilane (e.g., SILQUEST™ A-2120 from GE Silicones); bis-(γ-triethoxysilylpropyl)amine (e.g., SILQUEST A-1170 from GE Silicones); N-(2-aminoethyl)-3-aminopropyltributoxysilane; 6-(aminohexylaminopropyl)-trimethoxysilane; 4-aminobutyltrimethoxysilane; 4-aminobutyltriethoxysilane; p-(2-aminoethyl)phenyltrimethoxysilane; 3-aminopropyltris(methoxyethoxyethoxy)silane; 3-aminopropylmethyldiethoxysilane; oligomeric aminosilanes such as 3-(N-methylamino)-propyltrimethoxysilane (e.g., DYNASYLAN™ 1146 from Sivento Silanes of Piscataway, N.J.); N-(2-aminoethyl)-3-aminopropylmethyldimethoxysilane; N-(2-aminoethyl)-3-aminopropylmethyldiethoxysilane; N-(2-aminoethyl)-3-aminopropyltrimethoxysilane; N-(2-aminoethyl)-3-aminopropyltriethoxysilane; 3-aminopropylmethyldiethoxysilane; 3-aminopropylmethyldimethoxysilane; 3-aminopropyldimethylmethoxysilane; 3-aminopropyldimethylethoxysilane; 4-aminophenyltrimethoxy silane; 3-phenylaminopropyltrimethoxy silane; 2,2-dimethoxy-1-aza-2-silacyclopentane-1-ethanamine; 2,2-diethoxy-1-aza-2-silacyclopentane-1-ethanamine; 2,2-diethoxy-1-aza-2-silacyclopentane; 2,2-dimethoxy-1-aza-2-silacyclopentane; tertiary amines such as N,N-dimethyl aniline and diazabicyclooctane; and bis-silyl ureas such as $((RO)_3Si(CH_2)NR)_2C=O$. Mixtures of adhesion promoting agents may be employed.

Those skilled in the art will appreciate that the inventive coating compositions can contain other optional adjuvants, including surfactants, antistatic agents (e.g., conductive polymers), leveling agents, ultraviolet ("UV") absorbers, stabilizers, antioxidants, lubricants, pigments or other opacifiers, dyes, plasticizers, suspending agents and the like.

The inventive coatings may be applied using a variety of techniques that will be familiar to those skilled in the art. Exemplary coating methods include die coating, knife coating, spray coating, curtain coating and dip coating. The coating composition may be applied in a continuous manner, e.g., by coating a moving web or other support or substrate to provide a roll, or long coated length, of coated article. The coating composition may instead or in addition be applied to individual or multiple separate substrate portions to provide, for example, one or more singly or multiply coated articles.

The invention is further illustrated in the following examples, in which all parts, percentages and ratios are by weight unless otherwise indicated. Unless otherwise noted, all solvents and reagents were obtained from Aldrich Chemical Company, Milwaukee, Wis. All percents, parts and amounts are by weight unless otherwise specified. Unprimed Polyester was obtained from 3M Company of St. Paul, Minn., available under the trademark Scotchpar™ Dyneon™ Fluoropolymer THV220, Dyneon-FC 2145 fluoropolymer and Fluoroelastomer FPO 3740 as well as fluorinated acrylic polymer Novec™ were also obtained from 3M Company. Dyneon TF 2071, a poly(tetrafluoroethylene) powder (PTFE powder) was obtained from 3M Company. Polydimethylsiloxane-modified fumed silica (Fumed Aerosil TS-720) was obtained from Cabot Company of Chicago, Ill. Trimethylolpropane triacrylate SR 351 ("TMPTA") and benzyl dimethyl ketal UV photoinitiator (KB-1) were obtained from Sartomer Company of Exton, Pa. Darocur 1173 initiator was obtained from Ciba Specialty Chemicals, Tarrytown, N.Y.

Water contact angle measurements were made using a video contact angle analyzer model VCA-Optima available from AST Products of Billerica, Mass. Measurements are made using reagent-grade deionized water filtered through a filtration system from Millipore Corporation of Billerica, Mass. Static contact angle measurement values reported in Table 1 are average values based on three drops measured, on opposite sides of the drops. Drop volumes are 5 µL for static measurements.

Samples were evaluated for durability (resistance to rubbing or abrasion) using a Crockmeter (AATCC Model CM5 available from Atlas Electric Devices of Chicago, Ill. 60613). Specimens were rubbed with dry standard cotton cloth and mounted under the finger of the apparatus (16 mm diameter) which rested on the specimen with a force of 9 Newtons. A rubbing distance of 100 mm and stroke rate of 60 rpm were used.

Figure 2:
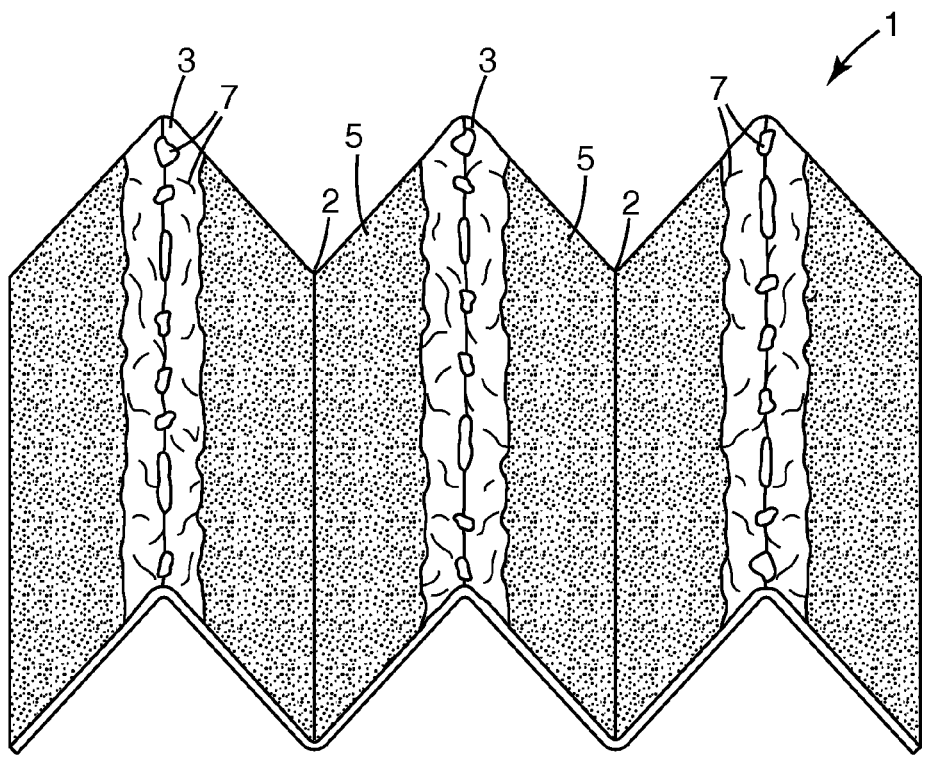
FIG. 2 is a schematic representation of a coating composition of the present invention on a micropatterned surface after being abraded with a Crockmeter test apparatus for 100 cycles.

FIG. 1 is an illustration of a saw-tooth (or V-groove) micro-patterned substrate (1) having uniform coating composition (5) of the invention applied to the surface including the recessed portions or valleys (2) and the raised portions or ridges (3). FIG. 2 is an illustration of a saw-tooth micropatterned substrate (1) having uniform coating composition (5) of the invention after being abraded with a Crockmeter apparatus for 100 cycles. The portions of the raised portions from which the inventive coating was removed by the test are shown as areas (7). The coating composition in the recessed portions (2) remained after the rubbing or abrasion test, and the whole surface retained a superhydrophobic property.

Preparation of Micropatterned Surface

An exemplary photopolymerizable resin composition is prepared by making a solution consisting of urethane acrylate oligomer obtained as Sartomer 6210 (74%, Sartomer Company, Inc. of Exton, Pa.), a diacrylate monomer obtained as Sartomer 238 (25%, Sartomer Company) and an initiator obtained as Darocur 1173. This solution was mixed for 30 minutes at room temperature and warmed to 25° C. in an oven prior to use.

In one useful method for making a micropatterned surface, a nickel master tool is made by diamond turning using a diamond cutting tool (U.S. Pat. No. 5,435,816). The tool had a pattern comprising a plurality of V grooves. The dihedral angle of the ridges between the V grooves was approximately 90°. The pitch of the grooves or distance from the lowest part of one groove to the lowest part of the adjacent groove was about 50 micrometers ($\mu$m) in the case of the tool used for Example 1. Depth of the grooves (i.e., distance between the lowest part of the grooves and a surface defined by the tops of the ridges) was about 12.5 $\mu$m. For the tool used in Example 2, included angle was about 60°, pitch was about 62.5 $\mu$m and depth of the V groove was about 62.5 $\mu$m.

A sheet of polyester (PET, polyethylene terephthalate) film (15 cm by 45 cm) is taped to the top edge of the master tool and folded back upon itself. A quantity or bead (12.7 mm. wide) of the photopolymerizable resin composition is placed, using an eyedropper, onto the master tool, across its width near the taped PET. The PET is lifted and held with the left hand while the right hand spread the resin solution between the PET and master tool. As the PET film is laid on top of the photopolymerizable resin composition, uniform pressure is applied to the side of the PET sheet opposite the resin composition, spreading the resin composition evenly over the nickel master tool covered by PET. The photopolymerizable resin composition is then cured under ultraviolet (UV) lights (Fusion "D" bulb, available from Fusion UV Systems, Inc. of Gaithersburg, Md.). The construction comprising the tool, photopolymerizable composition and PET is exposed to the UV light in two passes at 10.7 meters/min. PET with cured resin having a surface with microstructured "V" grooves is separated from the master tool after polymerization or curing of the resin.

Preparation of Hydrophobic Coating Composition #1

A powder comprising TS-720, fumed silica hydrophobic particles from about 5 nm to about 200 nm (1.5 parts per 100), is dispersed in methyl ethyl ketone (95 parts per 100). Fluoroelastomer FPO 3740 (2.7 parts per 100) is added to this dispersion and mixed for 15 minutes, followed by TMPTA (0.5 parts per 100), 3-aminopropyltriethoxysilane (0.25 parts per 100) and KB-1 (0.05 parts per 100) are added and the resulting mixture is stirred for additional 15 minutes at room temperature before use.

Preparation of Hydrophobic Coating Composition #2

PTFE powder (TF 2071) hydrophobic particles in a size range of about 3 to 5 $\mu$m (4.49 parts per 100), was dispersed in methyl ethyl ketone (95 parts per 100). Then, a fluoropolymer (copolymer of hexafluoropropylene and vinylidene fluoride) obtained as Dyneon 2145 (0.5 parts per 100) was added to the dispersion and mixed for 15 minutes, followed by addition of 1,12-diaminododecane (0.1 parts per 100) The resulting mixture was stirred for an additional 15 minutes at room temperature before use.

Preparation of Primed Substrates for Comparative Examples

Primer solution (1,6-hexanediol diacrylate/Darocur 1173, ratio 99:1) for Comparative Example 2 or 3-aminopropyltriethoxysilane (5 wt % in methanol) for Comparative Example 3 or photopolymerizable resin composition (prepared as described above) for Comparative Example 4 was coated on PET film with a meyer bar (#10, available from Paul N. Gardner Co., Inc. of Pompano Beach, Fla.) to obtain a coating with a thickness of 5 to 10 $\mu$m. The aminosilane primed substrate was dried at 100° C. for 10 minutes before use. The 1,6-hexanediol diacrylate (HDODA) primer and the photopolymerizable resin composition were cured by passing the primed material twice under UV lights (Fusion "D" bulb) at 10.7 meters per minute (m/min.)

Comparative Example 1

Hydrophobic coating composition made with fumed silica particles (no. 1 described above) was coated on unprimed PET film with a meyer bar (#20) to obtain a coating with a thickness of 1 to 15 $\mu$m. The samples were dried in an oven at 120° C. for 10 minutes and then cross-linked or cured under UV lights (Fusion "D" bulb) at 10.7 m/min. Samples were evaluated for hydrophobicity by measuring contact angles after number of test cycles in the Crock test as specified in table 1.

Comparative Example 2

The hydrophobic coating composition made with fumed silica particles (no. 1 described above) was coated on 1,6-hexanediol diacrylate primed PET film with a meyer bar (#20) to obtain a coating with a thickness of 1 to 15 $\mu$m. The samples were treated by the same oven drying and UV curing process as described above for Comparative Example 1. Results of contact angle measurements are shown in Table 1.

Comparative Example 3

The hydrophobic coating composition made with fumed silica particles (no. 1 described above) was coated on 3-aminopropyltriethoxysilane primed PET film with a meyer bar (#20) to obtain a coating with a thickness of 1 to 15 $\mu$m. The samples were treated by the same oven drying and UV curing process as described above for Comparative Example 1. Results of contact angle measurements are shown in Table 1.

Comparative Example 4

The hydrophobic coating composition made with fumed silica particles was coated on PET film (primed with the photopolymerizable composition described above for making the micropatterned surface) with a meyer bar (#20) to obtain a coating with a thickness of 1 to 15 $\mu$m. The samples were treated by the same oven drying and UV curing process as described above for Comparative Example 1. Results of contact angle measurements are shown in Table 1.

Example 1

The hydrophobic coating composition (designated number 1 above) was coated on PET with "V" Grooves (prepared as described above) with a meyer bar (#20) to obtain a coating with a thickness of 1 to 8 $\mu$m. The samples were dried in an oven at 120° C. for 10 minutes and then cross-linked or cured under UV lights (Fusion "D" bulb) at 10.7 m/min. Samples were evaluated by measuring contact angles after test cycles as specified in Table 1.

Example 2

The hydrophobic coating composition (designated number 1) was coated on PET with "V" Grooves (prepared as described above) with a meyer bar (#20) to obtain a coating with a thickness of 1 to 25 μm. The samples treated by an oven drying and UV curing process as described for Example 1. Data on the samples is reported in Table 1.

Example 3

The hydrophobic coating composition (designated number 2) was coated on PET with "V" Grooves (in the "V" groove direction) with a meyer bar (#20) to obtain a coating with a thickness of 1 to 25 μm. The samples were dried in an oven at 140° C. for 15 minutes to thermally cross-link or cure the polymer in the composition. Samples were evaluated for hydrophobicity by measuring contact angles after number of test cycles as specified in Table 1.

TABLE 1

| Example No. | Micro-pattern groove depth | Initial Contact Angle Static (Receding) Angle | Durability Test Results | | | | |
|---|---|---|---|---|---|---|---|
| | | | Contact Angle after 1 cycle Static (Receding) Angle | Contact Angle after 5 cycles Static (Receding) Angle | Contact Angle after 15 cycles Static (Receding) Angle | Contact Angle after 25 cycles, Static | Contact Angle after 100 cycles, Static |
| Comparative Ex 1 | None | >150° (150°) | <150° (121°) | | | | |
| Comparative Ex 2 | None | >150° (150°) | >150° (150°) | <150° | | | |
| Comparative Ex 3 | None | >150° (150°) | >150° (150°) | <150° (112°) | | | |
| Comparative Ex 4 | None | >150° (150°) | >150° (150°) | >150° (150°) | <150° (125°) | | |
| Example 1 | 12.5μ | >150° | >150° | >150° | >150° | >150° | <150° |
| Example 2 | 62.5μ | >150° | >150° | >150° | >150° | >150° | >150° |
| Example 3 | 62.5μ | >150° (150°) | >150° (150°) | >150° (150°) | >150°* | | |

*Contact angle measured after 10 cycles

The data in Table 1 demonstrate substantially improved durability of the inventive examples, as compared to the comparative examples, by the superior retention of a large contact angle (150°), indicative of a superhydrophobic surface, after repeated rubbing in the Crockmeter test.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure and the claims shown below are not limited to the illustrative embodiments set forth herein.

What is claimed is:

1. An article comprising:
    a substrate having a micropatterned surface comprising raised portions, recessed portions or a combination thereof; and
    a hydrophobic coating composition on the substrate located at least on the portions between the raised portions or in the recessed portions and comprising:
    a cross-linked fluoropolymer binder selected from the group consisting of poly-1,1-difluoroethylene; copolymers of 1,1-difluoroethylene and hexafluoropropylene, copolymers of tetrafluoroethylene and hexafluoropropylene; copolymers of 1,1-difluoroethylene and tetrafluoroethylene; terpolymers of hexafluoropropylene, tetrafluoroethylene, and ethylene; and terpolymers of tetrafluoroethylene, hexafluoro-propylene and 1,1-difluoroethylene and
    hydrophobic microparticles, hydrophobic nanoparticles, or a mixture thereof;
    in sufficient quantity to provide a very hydrophobic or superhydrophobic surface, the particle size of said hydrophobic particles being smaller than the center-to-center distance between the raised or recessed portions of the micropatterned surface.

2. The article of claim 1, wherein the coating composition forms a discontinuous layer interrupted by raised portions of the micropatterned surface.

3. The article of claim 1, wherein the microparticles or nanoparticles comprise a material selected from silicon oxide, aluminum oxide, calcium carbonate, titanium oxide, zirconium oxide, and mixtures thereof.

4. The article of claim 3, wherein the microparticles or nanoparticles have been modified by contacting with a hydrolytically reactive silane bearing at least one hydrolyzable group, and catalyst for sufficient time to enhance the hydrophobicity of the particles.

5. The article of claim 4, wherein the microparticles and nanoparticles comprise silica particles.

6. The article of claim 1, wherein the material of the substrate is selected from the group consisting of polyacrylates, polymethacrylates, polyesters, polypropylene, polyethylene, polystyrene, polyvinyl butyral, polycarbonates, polyimides, polyvinyl chloride, cellulose acetates and co-butyrates, fluoropolymers, and silicone rubbers.

7. The article of claim 6, wherein the substrate is selected from the group consisting of polyacrylates, polymethacrylates, polyesters, fluoropolymers, and a fluorinated acrylic polymer.

8. The article of claim 1, wherein the coating composition further comprises an adhesion promoting agent selected from the group consisting of photographtable silane esters containing olefinic functionality, amino-substituted organosilanes, N,N-dimethyl aniline, diazabicyclooctane and bis-silyl ureas.

9. The article of claim 1 on which the raised portions of the micropatterned surface are regular repeating features about 5 µm to about 150 µm above the recessed or other portions of the surface.

10. The article of claim 1 on which the micropatterned surface has repeating projecting features having a pitch of about 10 µm to 250 µm in length.

* * * * *

UNITED STATES PATENT AND TRADEMARK OFFICE
CERTIFICATE OF CORRECTION

PATENT NO. : 8,354,160 B2
APPLICATION NO. : 11/426122
DATED : January 15, 2013
INVENTOR(S) : Naiyong Jing It is certified that error appears in the above-identified patent and that said Letters Patent is hereby corrected as shown below:

In the Specifications

<u>Column 5</u>
Line 14 (approx.), delete "difluorethylene," and insert -- difluoroethylene, --

<u>Column 6</u>
Line 2, delete "1400," and insert -- 140° --

Signed and Sealed this
Thirtieth Day of July, 2013

Teresa Stanek Rea
*Acting Director of the United States Patent and Trademark Office*